May 3, 1949.  L. M. GREGG  2,468,971
POST DRIVER
Filed June 2, 1947  2 Sheets-Sheet 1
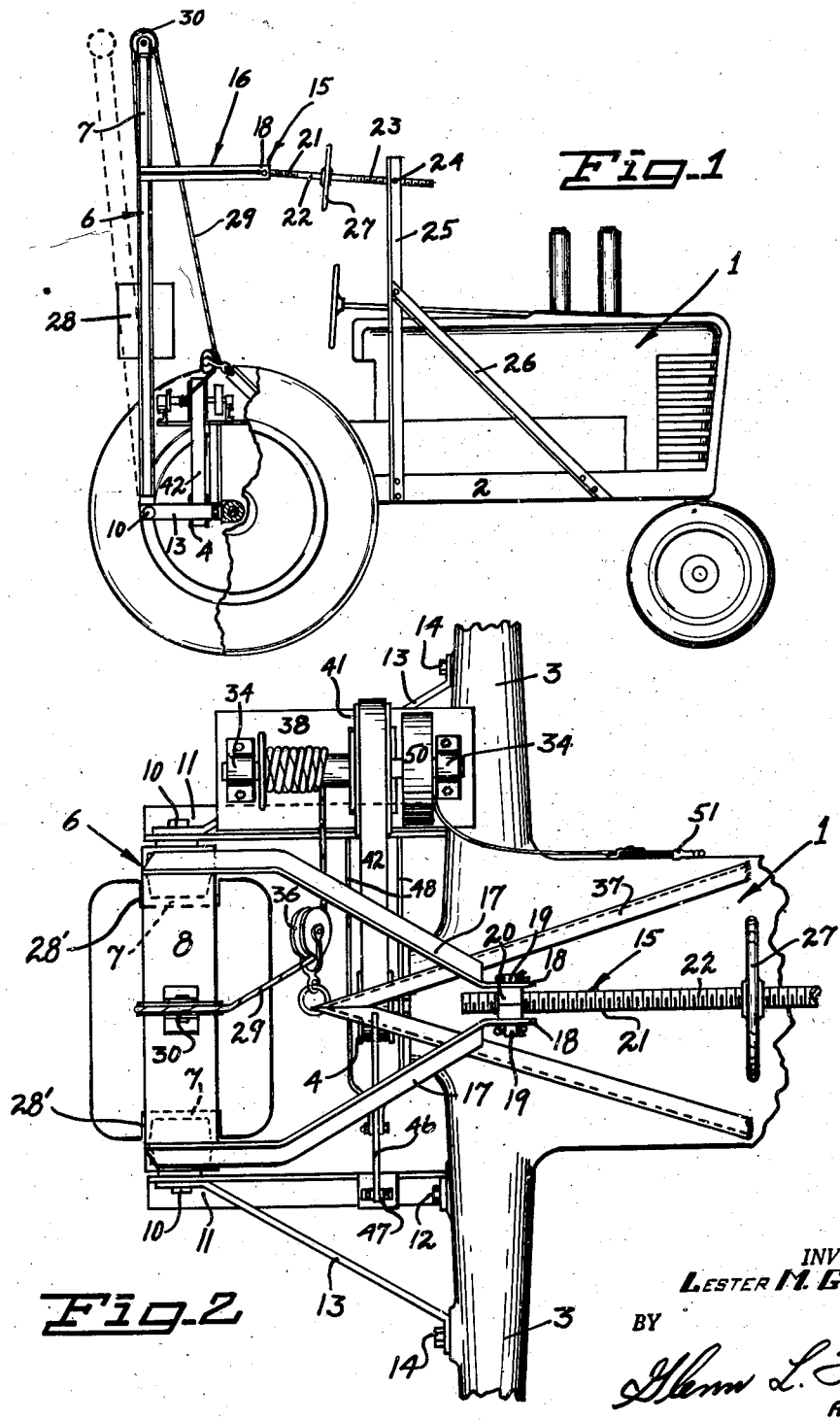
INVENTOR
LESTER M. GREGG
BY
Glenn L. Fish
ATTORNEY May 3, 1949.　　　　　L. M. GREGG　　　　　2,468,971
POST DRIVER
Filed June 2, 1947　　　　　　　　　　　2 Sheets-Sheet 2
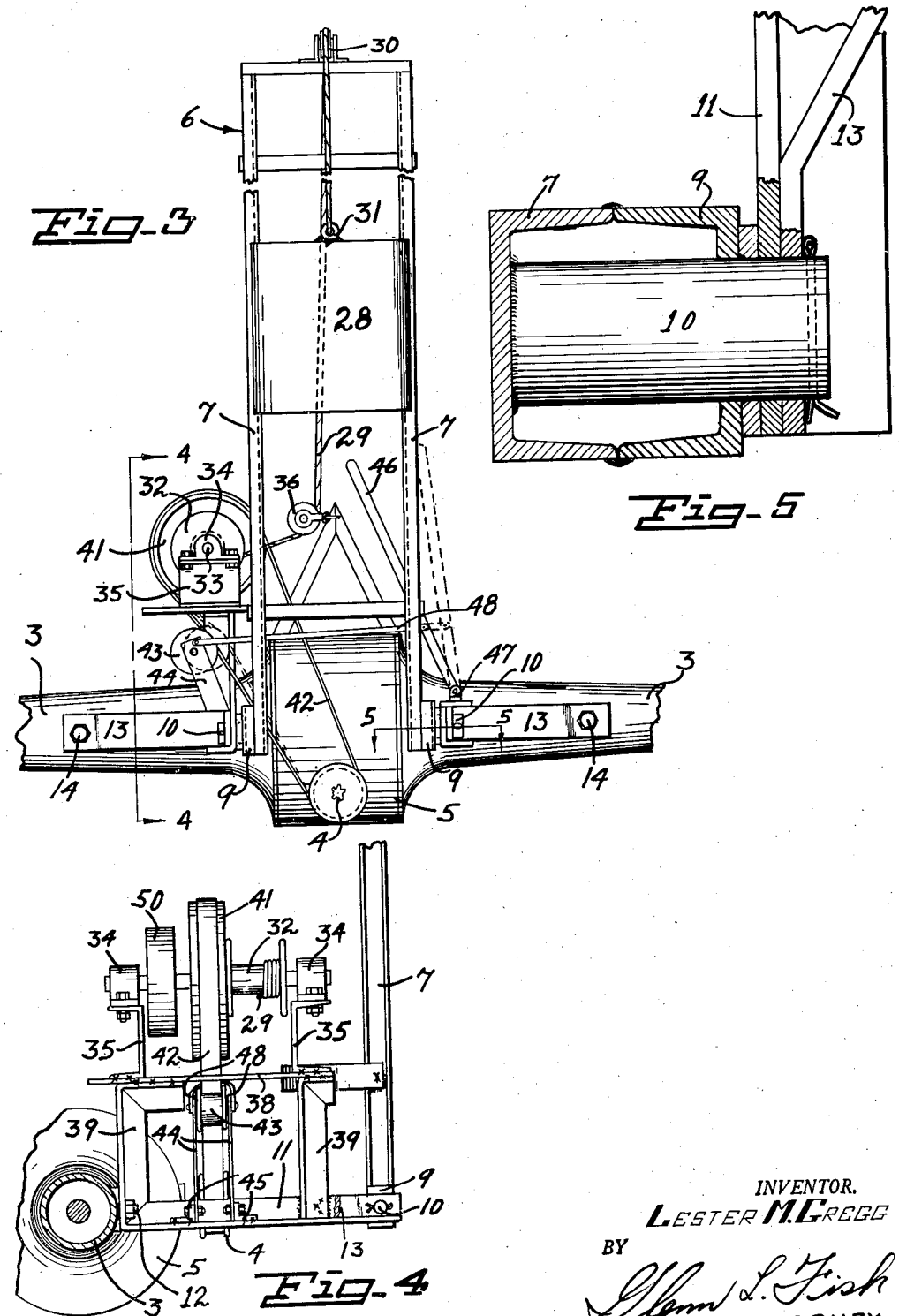
INVENTOR.
LESTER M. GREGG
BY
Glenn L. Fisk
ATTORNEY Patented May 3, 1949

2,468,971

UNITED STATES PATENT OFFICE 2,468,971

POST DRIVER

Lester M. Gregg, Newport, Wash.

Application June 2, 1947, Serial No. 751,723

6 Claims. (Cl. 61—74)

This invention relates to a post driver and it is one object of the invention to provide a post driver constituting an attachment for a tractor of the type known as farm tractors and thus allow the post driver to be readily moved along a fence line and posts driven into place in predetermined spaced relation to each other.

Another object of the invention is to provide a post driver having a frame adapted to be mounted vertically at the rear of the tractor and angularly adjusted forwardly and rearwardly so that the posts will be driven vertically into the ground along a fence line following the slope of a hill or extending along uneven ground.

Another object of the invention is to provide a post driver wherein the vertical frame is provided at opposite sides with bars constituting tracks slidably mounting a weight which is drawn upwardly to the top of the frame and then released so that it will drop and have striking contact with a post to be driven into the ground.

Another object of the invention is to provide a post driver having its frame mounted upon a bracket which is removably attached to the rear axle casing of a tractor and at one side carries a drum about which a cable for raising the striker or weight is wound, the drum being rotated by power obtained from the power take off of the tractor.

Another object of the invention is to provide an idler pulley so mounted that it will be under manual control and movable into position for applying pressure to a drive belt for the drum. It will thus be seen that by shifting the idler pulley into pressing engagement with the belt the weight will be shifted upwardly and that when pressure is removed the weight may drop and have striking contact with a post to be driven into the ground.

Another object of the invention is to provide a post driver which is simple in construction, easy to operate and also capable of being easily applied to or removed from a tractor.

The invention is illustrated in the accompanying drawings wherein:

Fig. 1 is a side view showing the improved post driver mounted upon a tractor of conventional construction.

Fig. 2 is a top plan view of the post driver and the rear portion of the tractor.

Fig. 3 is a rear view of the post driver.

Fig. 4 is a view taken along the line 4—4 of Figure 3.

Figure 5 is a fragmentary view taken along the line 5—5 of Figure 3.

This improved post driver constitutes an attachment for a tractor of conventional construction. Such a tractor is shown in Figure 1 and indicated in general by the numeral 1, and upon referring to this figure it will be seen that the tractor has the usual chassis bars and rear axle casing 3. There has also been shown in Figures 2 and 3 the usual power takeoff pulley 4 back of the differential housing 5 midway the length of the axle casing.

The post driver has a vertically extending frame 6 formed of channel metal and having side bars 7 connected at their upper ends by a cross bar or bridge 8. Short blocks or bars 9 are welded against lower ends of the side bars 6 and constitute braces for stub shafts or pivot bars 10 which project laterally from the lower end of the frame and are loosely mounted through rear ends of brackets 11. These brackets extend forwardly from the frame and at their front ends are secured to the axle casing by fasteners 12. Bracing strips 13 which have their front ends mounted about ends of the pivot bar and their rear ends secured to the axle casing by fasteners 14 prevent the brackets from moving transversely out of a position at right angles to the axle casing. It will thus be seen that the brackets which form a base or support for the frame will be firmly but detachably secured to the axle casing.

In order to hold the frame 6 upright and permit it to be swung forwardly and rearwardly to angularly adjusted positions there has been provided an adjustable brace 15 shown in Figures 1 and 2. This brace has at its rear a yoke 16 formed of bars 17 which have their rear ends welded to outer sides of the bars or tracks 7 of the frame 6. The arms or bars 17 converge forwardly and at their front ends are formed with tongues 18 pivoted upon pins 19 projecting from opposite sides of a nut 20. The nut receives the threaded rear end portion 21 of a shaft 22 and the threaded forward portion 23 of the shaft passes through a nut 24 pivotally mounted between upper ends of standards 25 mounted vertically upon the chassis bars 2 and held against tilting movement by braces 26. When the operator of the tractor grasps the wheel 27 and rotates the shaft the frame 6 will be tilted from a position perpendicular to the base of brackets 11 to a forwardly or rearwardly inclined position, as indicated by dotted lines in Figure 1, and fence posts may be driven vertically into the ground while the tractor is resting upon a sloping surface along which a fence is to be built. The fact that the nuts 20 and 24 are pivotally mounted allows the brace 15 to follow a straight line between the standards 25 and the frame 6.

In order to deliver driving blows upon a post there has been provided a heavy block or weight 28 formed of iron or other suitable material. This weight or block fits between the side bars of the frame 6 and at its opposite sides is formed with vertically extending grooves 28' into which the side bars or tracks 7 of the frame fit. The weight will thus be mounted for vertical sliding movement and may be drawn upwardly to a point near the top of the frame and then released so that it will slide downwardly and have striking contact with the upper end of a post to be driven into the ground. A cable 29 is employed for drawing the weight upwardly and this cable is trained about a pulley 30 mounted upon the cross bar or bridge 8 of the frame 6 and has one end secured through the eye 31 of the weight. The cable is wound about a drum 32 carried by a shaft 33 mounted through bearings 34 at upper ends of the bearing brackets 35 and between the drum and the pulley 30, the cable is engaged with a guide pulley 36 carried by a bracket 37 which is of an inverted V-shape and has lower ends of its arms secured to the tractor. The bearing brackets 35 are mounted vertically upon a shelf or platform 38 mounted over the bracket 11 at one side of the frame 6 by supports 39 rising from this bracket. A large pulley 41 is carried by the shaft 33 and about this pulley is trained a belt 42 which extends downwardly and inwardly from the shelf and is engaged with the power takeoff pulley 4 of the tractor and serves to transmit rotary motion from the power takeoff to the shaft 33. The belt fits loosely about the pulleys 4 and 41 but when it is tightened the shaft 33 will be rotated and the drum turned with it to wind the cable upon the drum and draw the weight upwardly. In order to tighten the belt there has been provided a belt tightener consisting of an idler pulley 43 rotatably mounted between upper ends of arms 44 which extend vertically under the outer or lower flight of the belt and have their lower ends pivoted to brackets 45 carried by the bracket 11 over which the arms are mounted. A lever 46 is pivoted to a bracket 47 carried by the other base bracket 11 and this lever is connected with the arms 44 by rods 48. When the lever is swung outwardly the pulley 43 is swung upwardly into engagement with the belt and the belt is tightened to cause rotary movement to be transmitted to the shaft 33. The cable will then be wound upon the drum and the weight drawn upwardly. Since the pulley 41 is a great deal larger than the pulley 4 the weight will be drawn upwardly slowly enough for an attendant to watch it and be sure that it does not travel upwardly a sufficient distance to strike the upper portion of the frame. When the weight has traveled upwardly as far as desired the lever is released and the idler pulley will move away from the belt and since the belt does not have frictional grip upon the pulley 41 the drum may turn in an unwinding direction and allow the weight to drop and have driving contact with the upper end of a post. This is repeated until the post has been driven into the ground as far as desired, the tractor being driven along the fence line and brought to a stop at the place where the next post is to be driven into the ground. Shaft 33 is also provided with a brake 50 operated by hand lever 51 to secure the weight 28 in raised position for transportation.

Having thus described the invention, what is claimed is:

1. A post driver comprising a vertical frame having side bars constituting tracks, brackets pivoted to and extending forwardly from lower ends of the side bars and adapted to be secured to a tractor and mount the frame rearwardly thereof, a weight between the side bars formed in opposite sides with grooves receiving the side bars and mounting the weight for sliding movement vertically in the frame, standards adapted to be mounted vertically at opposite sides of a tractor, a nut pivotally mounted between upper ends of said standards, a yoke having side arms pivotally mounted adjacent upper ends of the side bars of said frame and extending forwardly therefrom, a nut pivotally mounted between front ends of the side bars of the yoke, a shaft having threaded front and rear end portions about which the nuts fit and a hand wheel intermediate its length for turning the shaft and tilting the frame forwardly and rearwardly to angularly adjusted positions, a shelf mounted above said brackets, bearing brackets carried by said shelf, a shaft rotatably supported by the bearing brackets, a drum carried by said shaft, a cable wound upon said drum, a pulley at the top of said frame, a guide pulley, a support for the guide pulley adapted to be mounted upon the tractor and support the guide pulley forwardly of the frame, said cable having a portion extending from the drum and engaged with the pulleys and extending downwardly from the pulley at the top of the frame and attached to the weight, a large pulley carried by said shaft, a belt engaged about the large pulley for transmitting rotary motion to the shaft and the drum from a power takeoff pulley of a tractor, a lever pivoted to the bracket at the other side of the frame from said shelf, arms pivoted to the bracket under the shelf, an idler pulley rotatably mounted between upper ends of the arms, and rods connecting said lever with said arms for swinging the arms upwardly and holding the idler pulley in engagement with the belt to tighten the belt and cause rotation of the drum to wind the cable thereof and draw the weight upwardly when the lever is swung in one direction.

2. A post driver comprising a vertical frame, supporting brackets extending forwardly from sides of said frame for mounting the frame rearwardly of a tractor, a guide pulley at the top of said frame, a weight slidable vertically in said frame for striking contact with a post as it moves downwardly in the frame, a platform mounted above one bracket, bearing brackets rising from said platform, a shaft rotatably carried by the bearing brackets, a drum carried by said shaft, a cable wound about said drum and having a portion extending therefrom and trained about the guide pulley and then downwardly and secured to the weight for drawing the weight upwardly when the drum is rotated in a winding direction, means for transmitting rotary movement to the shaft from a power takeoff pulley of a tractor consisting of a pulley on the shaft and a belt trained about the pulley, arms pivotally mounted under the platform for vertical swinging movement, an idler pulley rotatably carried by said arms, a lever pivoted to the bracket at the opposite side of said frame, and rods connecting the lever with the arms for swinging the arms upwardly and holding the idler pulley in tightened engagement with the belt to cause rotation of the shaft and upward movement of the 3. A post driver comprising a vertical frame having supporting means projecting forwardly from its lower end and adapted to be removably secured to a tractor and mount the frame rearwardly thereof, an auxiliary frame adapted to be mounted vertically upon a tractor and having a nut at its upper end, a yoke pivoted to said frame and projecting forwardly therefrom and having a nut at its front end, an adjusting shaft extending between the yoke and the auxiliary frame and having threaded end portions passing through the nuts, said shaft when turned serving to tilt the vertical frame to angularly adjusted positions and hold the same in an adjusted position, a platform carried by the supporting means at one side of the vertical frame, a shaft rotatably mounted above said platform and carrying a drum, a weight slidable vertically in the vertical frame, a cable wound about said drum and having a portion extending therefrom and over the top of the vertical frame and then downwardly and secured to the weight for raising the weight when the shaft and drum are rotated in a winding direction, a pulley carried by said shaft, a belt trained about said pulley for transmitting rotary motion to the shaft, arms pivotally mounted under the platform for vertical swinging movement, an idler pulley carried by said arms, a lever, and rods connecting said lever with said arms for swinging the arms upwardly and moving the idler pulley into engagement with the belt to tighten the belt and cause rotation of the shaft and the drum in a winding direction when the lever is moved in one direction.

4. A post driver comprising a vertical frame having supporting means projecting forwardly from its lower end and adapted to be removably secured to a tractor and mount the frame rearwardly thereof, an auxiliary frame adapted to be mounted vertically upon a tractor and having a nut at its upper end, a yoke pivoted to said frame and projecting forwardly therefrom and having a nut at its front end, an adjusting shaft extending between the yoke and the auxiliary frame and having threaded end portions passing through the nuts, said shaft when turned serving to tilt the vertical frame to angularly adjusted positions and hold the same in an adjusted position, a shaft rotatably mounted and carrying a drum, a weight slidable vertically in said drum, a cable wound upon said drum and having a portion extending therefrom and secured to the weight for raising the weight when the drum is rotated in a winding direction, means for transmitting rotary motion in a winding direction from the power takeoff of a tractor to the shaft and the drum consisting of a pulley carried by the shaft and a belt trained about the pulley, and a belt tightened movable into and out of tightening engagement with the belt.

5. A post driver comprising a vertical frame having supporting means projecting forwardly from its lower end and adapted to be removably secured to a tractor and mount the frame rearwardly thereof, an auxiliary frame adapted to be mounted vertically upon a tractor and having a nut at its upper end, a yoke pivoted to said frame and projecting forwardly therefrom and having a nut at its front end, an adjusting shaft extending between the yoke and the auxiliary frame and having threaded end portions passing through the nuts, said shaft when turned serving to tilt the vertical frame to angularly adjusted positions and hold the same in an adjusted position, a weight slidable vertically in said frame, a drum, a shaft rotatably mounting the drum, a cable wound upon said drum and connected with the weight for raising the weight when the shaft is rotated in a winding direction, means for transmitting rotary motion to the shaft from the power takeoff of a tractor, and manually actuated means for controlling transmission of rotary motion to the shaft.

6. A post driver comprising a frame, means for mounting the frame vertically back of a tractor, means for tilting the frame vertically and holding the frame in angularly adjusted positions, a weight slidable upwardly in said frame and then downwardly for driving engagement with a post, a platform mounted outwardly and forwardly of one side of the lower end of said frame, a shaft rotatably mounted over said platform and carrying a drum, a cable wound about the drum and connected to the weight for drawing the weight upwardly when the shaft is rotated in a direction to wind the cable upon the drum, a pulley carried by said shaft, a belt trained about said pulley for transmitting rotary motion from the power take-off of a tractor to the shaft, a belt tightener under the platform movable into and out of tightening engagement with the belt, and a lever at the other side of the mounting for the frame from the belt tightener connected with the belt tightener for moving the belt tightener into tightening engagement with the belt when the lever is moved in one direction.

LESTER M. GREGG.

REFERENCES CITED

The following references are of record in the file of this patent:

UNITED STATES PATENTS

| Number | Name | Date |
|---|---|---|
| 2,040,668 | Nichols | May 12, 1936 |
| 2,392,027 | Cutrer | Jan. 1, 1946 |
| 2,399,190 | Kelly | Apr. 30, 1946 |
| 2,435,651 | Huber | Feb. 10, 1948 |